(12) United States Patent
Isom et al.

(10) Patent No.: US 10,896,302 B2
(45) Date of Patent: Jan. 19, 2021

(54) SYSTEMS AND METHODS FOR TRACKING ITEMS USING BONDING MATERIALS

(71) Applicant: Counted, LLC, Salt Lake City, UT (US)

(72) Inventors: Michael Isom, West Valley, UT (US); Duane Michael Scott Johnson, Cottonwood Heights, UT (US)

(73) Assignee: Counted, LLC, Salt Lake City, UT (US)

( * ) Notice: Subject to any disclaimer, the term of this patent is extended or adjusted under 35 U.S.C. 154(b) by 0 days.

(21) Appl. No.: 16/178,563

(22) Filed: Nov. 1, 2018

(65) Prior Publication Data

US 2019/0130146 A1 May 2, 2019

Related U.S. Application Data

(60) Provisional application No. 62/627,523, filed on Feb. 7, 2018, provisional application No. 62/580,557, filed on Nov. 2, 2017.

(51) Int. Cl.
| | |
|---|---|
| *G06K 7/10* | (2006.01) |
| *G06Q 10/08* | (2012.01) |
| *G06K 19/077* | (2006.01) |
| *G01N 27/22* | (2006.01) |

(52) U.S. Cl.
CPC ....... *G06K 7/10366* (2013.01); *G01N 27/228* (2013.01); *G06K 19/07758* (2013.01); *G06Q 10/087* (2013.01)

(58) Field of Classification Search
CPC ......... G06K 7/10366; G06K 19/07758; G01N 27/228; G06Q 10/087
See application file for complete search history.

(56) References Cited

U.S. PATENT DOCUMENTS

| | | |
|---|---|---|
| 6,140,146 A | 10/2000 | Brady et al. |
| 6,220,516 B1 | 4/2001 | Tuttle et al. |
| 6,478,229 B1 | 11/2002 | Epstein |
| 6,483,473 B1 | 11/2002 | King et al. |
| 6,794,000 B2 | 9/2004 | Adams et al. |
| 7,183,920 B2 | 2/2007 | Napolitano |
| 7,319,397 B2 | 1/2008 | Chung et al. |
| 7,477,150 B2 | 1/2009 | Renzetti et al. |
| 7,535,358 B2 | 5/2009 | Crider et al. |
| 7,564,354 B2 | 7/2009 | Eren et al. |
| 7,712,674 B1 | 5/2010 | Warner et al. |
| 7,744,004 B2 | 6/2010 | Kato et al. |
| 7,812,726 B2 | 10/2010 | Barlow, Jr. et al. |
| 8,079,247 B2 | 12/2011 | Russell et al. |

(Continued)

*Primary Examiner* — Seung H Lee
(74) *Attorney, Agent, or Firm* — FisherBroyles, LLP (57) ABSTRACT

Embodiments are directed to an apparatus for tracking usage of a product. The apparatus includes the following: a structural layer that includes at least some portion of electrically conductive material, an adhesive layer, a microcontroller, and a transceiver. The microcontroller is electrically connected to the conductive material in the structural layer, and is configured to monitor the conductive material for changes in at least one electrical property. Upon determining that an electrical property has changed, the microcontroller determines where the apparatus is located and when the change occurred, and further reports the determination to various specified entities.

20 Claims, 5 Drawing Sheets

(56) References Cited

U.S. PATENT DOCUMENTS

| | | |
|---|---|---|
| 8,692,674 B2 | 4/2014 | Hioki et al. |
| 8,698,627 B2 | 4/2014 | Londo et al. |
| 9,058,733 B2 | 6/2015 | Brinkley et al. |
| 9,773,743 B2 | 9/2017 | Maijala |
| 9,856,049 B2 | 1/2018 | Seymour |
| 9,877,296 B2 | 1/2018 | Kelly |
| 2003/0122670 A1* | 7/2003 | Stern .................. G06Q 10/08 340/568.1 |
| 2005/0183990 A1 | 8/2005 | Corbett |
| 2005/0242957 A1* | 11/2005 | Lindsay ............ G06K 19/0716 340/572.7 |
| 2006/0022801 A1 | 2/2006 | Husak |
| 2006/0109130 A1 | 5/2006 | Hattick et al. |
| 2006/0180647 A1 | 8/2006 | Hansen |
| 2006/0198080 A1 | 9/2006 | Hawes et al. |
| 2006/0290471 A1 | 12/2006 | Van Alstyne |
| 2007/0008121 A1 | 1/2007 | Hart |
| 2007/0069895 A1 | 3/2007 | Koh |
| 2007/0096918 A1 | 5/2007 | Badillo et al. |
| 2007/0109103 A1 | 5/2007 | Jedrey et al. |
| 2007/0185613 A1 | 8/2007 | Feldenzer |
| 2009/0189763 A1 | 7/2009 | Brinkley et al. |
| 2010/0156606 A1 | 6/2010 | Gold |
| 2011/0186459 A1 | 8/2011 | Weller |
| 2011/0285507 A1 | 11/2011 | Nelson |
| 2013/0285681 A1 | 10/2013 | Wilson et al. |
| 2016/0343360 A1 | 11/2016 | Bailey |

* cited by examiner

SYSTEMS AND METHODS FOR TRACKING ITEMS USING BONDING MATERIALS

CROSS-REFERENCE TO RELATED APPLICATIONS

This application claims priority to and the benefit of U.S. Provisional Patent Application Ser. No. 62/580,557, filed on Nov. 2, 2017, entitled "Systems and Methods for Tracking Items Using Bonding Materials," and U.S. Provisional Patent Application Ser. No. 62/627,523, filed on Feb. 7, 2018, entitled "Systems and Methods for Tracking Items Using Bonding Materials," both of which applications are incorporated by reference herein in their entirety.

BACKGROUND

Items for sale online or in stores are typically placed in some type of packaging for travel to their ultimate destination. The packaging is designed to protect the items as they travel from a manufacturer to a distributor or to a customer. This packaging may include boxes, tape, packing material, envelopes, shipping labels or other items. The packages are then shipped to their destinations, but the senders have no way of knowing whether the packages were opened or not. Radio frequency identifiers (RFIDs) attached to the package may be used to determine that a package has arrived at a certain location, but they do not indicate whether the package was opened.

BRIEF SUMMARY

Embodiments described herein are directed to an apparatus for tracking usage of a product. The apparatus may include a power supply, a structural layer that includes electrically conductive material, an adhesive layer that adheres the structural layer to an item, a microcontroller that is electrically connected to the conductive material in the structural layer, and a transceiver. The microcontroller may be designed to monitor the conductive material for changes in electrical properties, determine that at least one electrical property has changed in the conductive material, determine a current location of the apparatus and/or a time when the change occurred, and report the results of the determinations to various entities including manufacturers or distributors.

In another embodiment, a system is provided which may include the following: a structural layer that provides support for other system components, an electrically conductive layer that includes at least some portion of electrically conductive material, an adhesive layer that is applied to at least a portion of the electrically conductive layer, and a processor that is electrically connected to the electrically conductive material in the electrically conductive layer. The processor may be configured to monitor the conductive material for incremental changes in various electrical properties.

In another embodiment, a method may be provided for monitoring usage of an item. The method may include attaching tracking bonding material to an item, such that the tracking bonding material is affixed to the item. The tracking bonding material may include a microprocessor, a power supply, a transceiver and one or more sensors electrically connected to the microprocessor. The method may further include communicating with the sensors to determine a current level of electrical properties associated with the tracking bonding material. The method may also include storing an initial electrical property measurement in memory, and periodically waking the microprocessor to determine at various future points in time, using the sensors, the current level of the electrical properties associated with the tracking bonding material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to an apparatus for tracking usage of a product. The apparatus may include a power supply, a structural layer that includes electrically conductive material, an adhesive layer that adheres the structural layer to an item, a microcontroller that is electrically connected to the conductive material in the structural layer, and a transceiver. The microcontroller may be designed to monitor the conductive material for changes in electrical properties, determine that at least one electrical property has changed in the conductive material, determine a current location of the apparatus and/or a time when the change occurred, and report the results of the determinations to various entities including manufacturers or distributors.

In another embodiment, a system is provided which may include the following: a structural layer that provides support for other system components, an electrically conductive layer that includes at least some portion of electrically conductive material, an adhesive layer that is applied to at least a portion of the electrically conductive layer, and a processor that is electrically connected to the electrically conductive material in the electrically conductive layer. The processor may be configured to monitor the conductive material for incremental changes in various electrical properties.

In another embodiment, a method may be provided for monitoring usage of an item. The method may include attaching tracking bonding material to an item, such that the tracking bonding material is affixed to the item. The tracking bonding material may include a microprocessor, a power supply, a transceiver and one or more sensors electrically connected to the microprocessor. The method may further include communicating with the sensors to determine a current level of electrical properties associated with the tracking bonding material. The method may also include storing an initial electrical property measurement in memory, and periodically waking the microprocessor to determine at various future points in time, using the sensors, the current level of the electrical properties associated with the tracking bonding material.

Embodiments described herein may implement microcontrollers, embedded processors or other types of systems generally referred to as computing devices or computing systems. These computing systems are now increasingly taking a wide variety of forms. As used herein, the term "computing system" includes any device, system, or combination thereof that includes at least one processor, and a physical and tangible computer-readable memory capable of having thereon computer-executable instructions that are executable by the processor. A computing system may be configured with various radios or other transceivers capable of communicating to other computing systems. For example, a transceiver may communicate to a mobile computing device (e.g. a phone or tablet), to a stationary device such as a PC, or to a cloud computing environment.

The devices and systems described herein may include multiple different communication channels that allow the devices and systems to communicate with other message processors over a wired or wireless network. Such communication channels may include hardware-based receivers, transmitters or transceivers, which are configured to receive data, transmit data or perform both. Embodiments described herein also include physical computer-readable media for carrying or storing computer-executable instructions and/or data structures. Such computer-readable media can be any available physical media that can be accessed by a general-purpose or special-purpose computing system. This may include flash memory, hard drives, processor cache memory, random access memory or similar.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
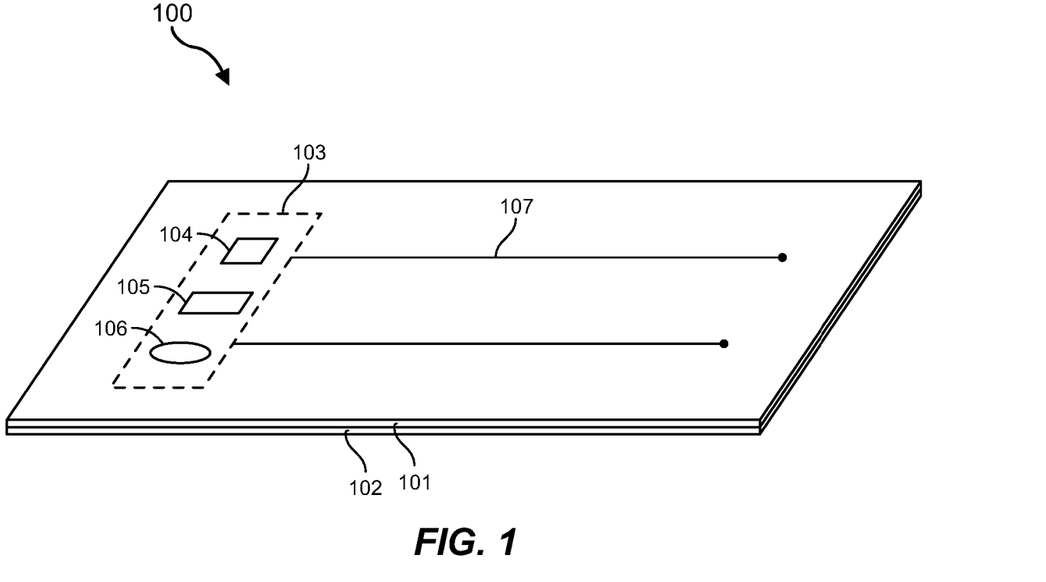
FIG. 1 illustrates an embodiment of an apparatus for tracking usage of a product.

FIG. 1 illustrates one embodiment of an apparatus for tracking usage of an item. The apparatus 100 includes a structural layer 101 that has at least some portion of electrically conductive material. In some cases, the electrically conductive material may include conductive traces 107. The traces may run in a straight line, as shown in FIG. 1, or may wind throughout the structural layer 101 in various patterns including spiral or zig-zag shapes. The traces may extend from one end of the apparatus 100 to the other end or may extend only through portions thereof. In some cases, the electrically conductive material may be applied in a single thin layer, while in other cases, the electrically conductive material is applied in two or more layers that are separated by a dielectric layer.

Indeed, as will be explained further below, the dielectric layer may be positioned between the electrically conductive layers or between two electrically conductive traces (e.g., 107). The dielectric layer may be comprised of ceramic, glass, mica, plastic film, paper, oxide layers, or other materials that are configured to act as a dielectric, storing a certain amount of charge. In some embodiments, the dielectric layer may be pliable, such as in cases where plastic film or paper are used as the dielectric. Such dielectrics may be used in the tape and sticker embodiments described below.

The dielectric layer may store electrical energy provided via the electrically conductive layers or via the electrically conductive traces 107. This stored electrical energy may be measured at times by the microcontroller 104 and stored as the measured capacitance at that time. If parts of the dielectric layer have been torn, a smaller capacitance will be measured at the traces or at one or more capacitance sensors. The dielectric layer may also provide a certain measure of resistance between the electrically conductive layers. Like the capacitance, resistance can also be measured by the microcontroller 104. Various sensors may be put in place which measure or detect the level of resistance between the electrically conductive layers. In a similar manner, if parts of the dielectric layer have been torn or ripped, the microcontroller may record an increase in resistance as the air between the torn segments provides more resistance than was provided by the dielectric.

In some embodiments, the electrically conductive material may include conductive ink. The conductive ink may be applied to all or a portion of the structural layer 101 of the apparatus 100. The conductive ink may be applied in the form of traces, or as long, wide strips (e.g., in a roll of tape). The conductive ink may conduct an electrical pulse from a source to a destination. For example, a power supply such as a battery) may be used to provide an electrical pulse or signal. The electrical pulse may travel through the conductive ink (or other electrically conductive layer) from a power source (e.g., battery 106) to an endpoint. Some of the electrical energy from the pulse may be stored in the dielectric, registering as a measure of capacitance.

In some embodiments, the battery 106 may provide an electrical current through the electrically conductive material (e.g. 107). When this current is interrupted or broken, a change in current will be noted. Indeed, the microcontroller 104 may be configured to monitor one or more electrical properties of the conductive material (e.g. amount of current flow, voltage, resistance, capacitance, etc.). When any one or more of these electrical properties changes, the microcontroller 104 may determine that a certain action has occurred. In cases where the apparatus 100 is a strip of tape or a sticker, for example, the microcontroller 104 may determine that a package or envelope has been torn, ripped or opened.

It should be noted that the battery may be optional in some embodiments. The electrically conductive material may, for example, receive energy from radio waves emitted from a data reading device. Such power transfer may occur via resonant inductive coupling or via another wireless power transfer mechanism. In such cases, the reading device may provide sufficient power to operate the microcontroller and/or the transceiver. A capacitor or other means for storing DC power may be used to temporarily store the power received from the reading device. In cases where a battery is used, the battery may be used to supplement any power received from the reading device.

The apparatus 100 may further include an adhesive layer 102. The adhesive layer may include substantially any type of bonding material that would cause one surface to adhere to another. In some cases, when the structural layer 101 and the adhesive layer 102 are combined, they form tape. In other cases, the two layers 101 and 102 may form a sticker. In still other cases, the two layers 101 and 102 may form the binding end of a package or envelope. For simplicity's sake, although the apparatus 100 may be manufactured in the form of tape, stickers, envelopes, packages or other binding materials, the apparatus 100 will often be referred to herein as tape or capacitive tape. One skilled in the art will recognize, however, that these references to tape may refer to any of the above-listed embodiments.

Figure 6:
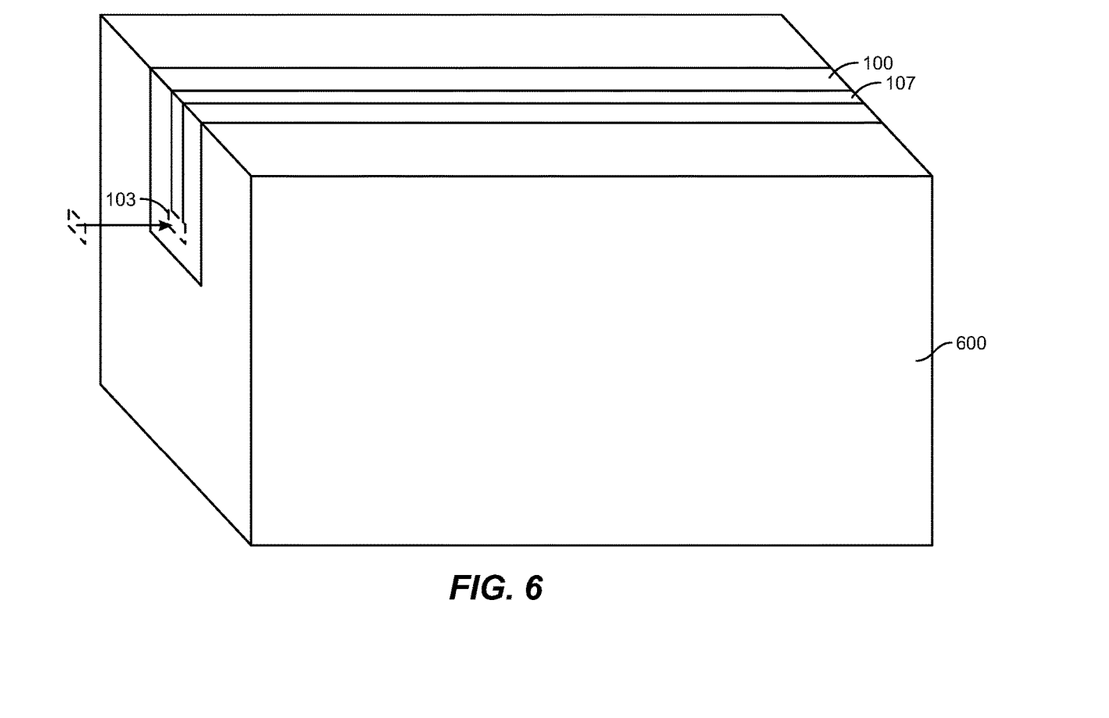
FIG. 6 illustrates an embodiment in which a tracking bonding material is applied to a box.

The microcontroller 104, a transceiver 105 and/or the optional battery 106 may be part of a single chip or other hardware structure 103 that can be added to the tape or embedded in the tape. For instance, the hardware structure 103 may be detachable from the apparatus 100 and may be attached at a later time (e.g., as shown in FIG. 6). For instance, the tape may include conductive traces 107 and may include junctions or nodes where the hardware structure 103 may be attached. In some cases, for example, the hardware structure may be attached to a box after it has been sealed shut with capacitive tape. The hardware structure 103 may be attached so that at least some of its electrical components (e.g., the microprocessor 104 and the battery 106) are electrically connected to the traces 107. The hardware structure 103 may be detached at a later point in time (e.g., after delivery). The hardware structure 103 may then be recycled or reused in another tracking application (e.g., on another box or package).

Figure 2:
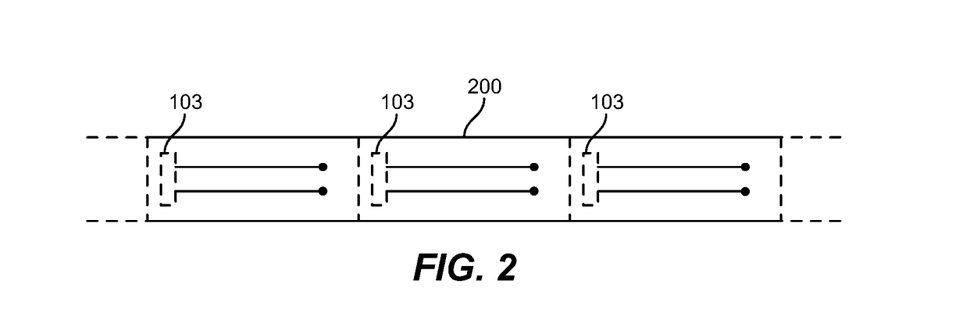
FIG. 2 illustrates an embodiment of a combination of tape segments linked together.

In other cases, the hardware structure 103 or each separate component may be embedded in the tape. The components may, for example, be embedded in the tape every 12 inches, or every 18 inches, or at some other increment. For example, as shown in FIG. 2, a roll of tape 200 may include multiple different segments, each with its own hardware module and/or individual components embedded inside. Such rolls of tape may be used for packaging certain sizes of boxes. Each segment of tape may fit over the top edge and sides of a box. Each segment of tape may be torn or cut along the perforations, thereby ensuring that the traces 107 of other tape segments are not disturbed. In some cases, the boxes or packages may have RFID tags attached to them or built into them. The embedded microcontroller may be configured to communicate with such RFID tags or other identifiers that are already part of the package to which the tape or sticker is to be applied.

The microcontroller 104 may be electrically connected to the conductive material (e.g. 107) in the structural layer 101. The microcontroller 104 may be configured to monitor the conductive material for changes in at least one electrical property. As noted above, these properties may include current, voltage, resistance, capacitance, inductance or other electrical properties. When the microcontroller determines that an electrical property has changed (and in some cases has changed by at least a minimum threshold amount), the microcontroller determines where the apparatus is located and/or when the change occurred. The microcontroller may activate the transceiver to communicate with other systems including, for example, global positioning systems, WiFi networks, Bluetooth networks, cellular networks, long range (LoRa) low power wireless networks, or other networks to determine where it is currently located, and what the current time is. In some cases, the microcontroller may have (or have access to) an internal clock that maintains time, indicating when the electrical properties changed.

Accordingly, the microcontroller 104 can determine the time and location when a change in electrical properties occurred or when a minimum threshold change in electrical properties occurred. The microcontroller 104 may then report the determination to various entities including perhaps a specified users' mobile phone or other device (e.g., the intended recipient of a package), a cloud system such as an inventory management system, a customer care department that tracks, for example, packages or envelopes, or other specified entities. In this manner, a manufacturer or distributor of a product may be able to receive an indication of when and where the product's packaging was opened. A lack of received signal may indicate that the package has not been opened. As such, the manufacturer or distributor may also be aware if the package or envelope has not been opened.

As noted above, the microcontroller, transceiver, battery and other components may be embedded in the structural layer 101 of the apparatus 100. If the tape is produced in rolls, a combined hardware structure such as 103 that combines the electrical components may be embedded into the roll of tape at periodic lengths (e.g. every foot, every 18 inches, or every two feet, etc.). Alternatively, the combined structure 103 may simply be fastened to a package prior to shipping. One or more electrical leads attached to the microcontroller may be electrically connected to the conductive material (e.g. 107) of the tape or sticker. Placement and number of electrical components may vary as needed and as desired by a manufacturer or packaging company.

In cases where the microcontroller 104 is embedded in the apparatus 100, the microcontroller may have a unique identifier that identifies itself, and also has access to an identifier that identifies the apparatus (e.g. each segment of tape or each sticker). Each roll of tape or each section of tape may have a unique identifier. This identifier may be tied to an RFID chip for the product. Thus, using the identifier of the product and the identifier of the microcontroller, the microcontroller can indicate which package (among many different potentially similar packages) was opened and where the package was when it was opened.

Once the microcontroller 104 has determined that the package was opened, the microcontroller may use the transceiver 105 to communicate with various local or cloud computing systems. In cases where a package is highly important, such as a package that includes medications or a check with a high dollar amount, the manufacturer or distributing entity may want to know when and where (and if) the package was opened. Other highly valuable packages such as jewelry or important tax or legal documents may similarly be sealed using an apparatus similar to 100.

Figure 3:
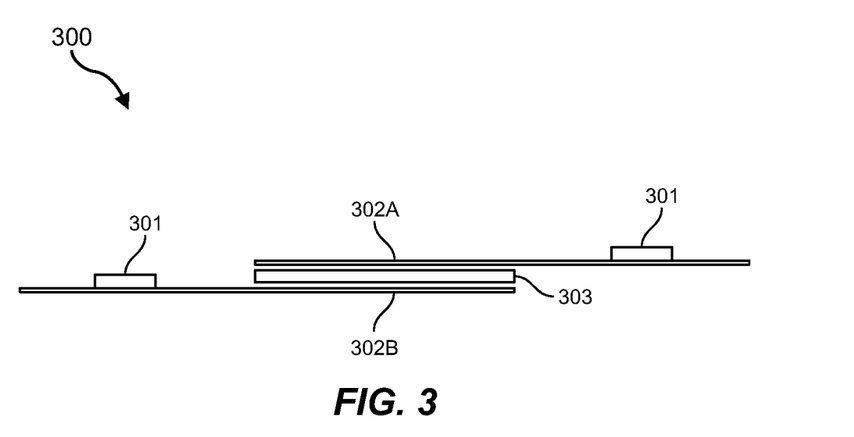
FIG. 3 illustrates a side view of an embodiment of a tracking bonding material.

As shown in FIG. 3, capacitive tape 300 (or sticker) may include one or more connections to a capacitance sensor 301. The capacitance sensors 301 may be connected to two different sheets of conductive foil 302A and 302B. The sheets of conductive foil 302A and 302B may be separated by a dielectric 303. The dielectric, as noted above, may be made of ceramic, glass, paper, plastic or any other material that is capable of acting as a dielectric. The conductive foil sheets may be made of aluminum, copper, or other conductive elements. The two conductive foils and the dielectric may function as a capacitor that stores a certain amount of charge. In some cases, the charge may be relatively small, e.g., on the level of 5-50 microfarads. In other cases, the charge may be larger, e.g., on the level of 5-50 millifarads. It will be recognized here that substantially any level of charge may be detected, whether it be millifarads, microfarads, nanofarads, picofarads or other levels of stored charge.

While capacitance sensors 301 are shown in FIG. 3, it will be understood that other typed of sensors may also be used, in addition to or as an alternative to the capacitance sensors 301. For example, the sensors may be resistance sensors. The resistance sensors may measure a resistance across the dielectric, from one conductive foil layer to the other. This measure of resistance may change as the tape is torn apart. Voltage, current, permittivity, inductance or other electrical properties may be measured in a similar manner. In some embodiments, a hall effect sensor may be used to detect changes in current between two points. In other cases, additional hardware components including magnets may be used to detect when packaging material has been ripped or torn.

For example, magnets may be placed at different positions within the two conductive foil layers. A current may be run between the magnets and a given measurement of a magnetic field may be noted by the microcontroller 104. Subsequent changes in the magnetic field may be noted and, if sufficiently large, may indicate that the tape, sticker or other form of apparatus 100 has been torn. Accordingly, many different techniques may be used alone or in combination with each other to provide an accurate indication of when and where a package or other item was opened.

Figure 4:
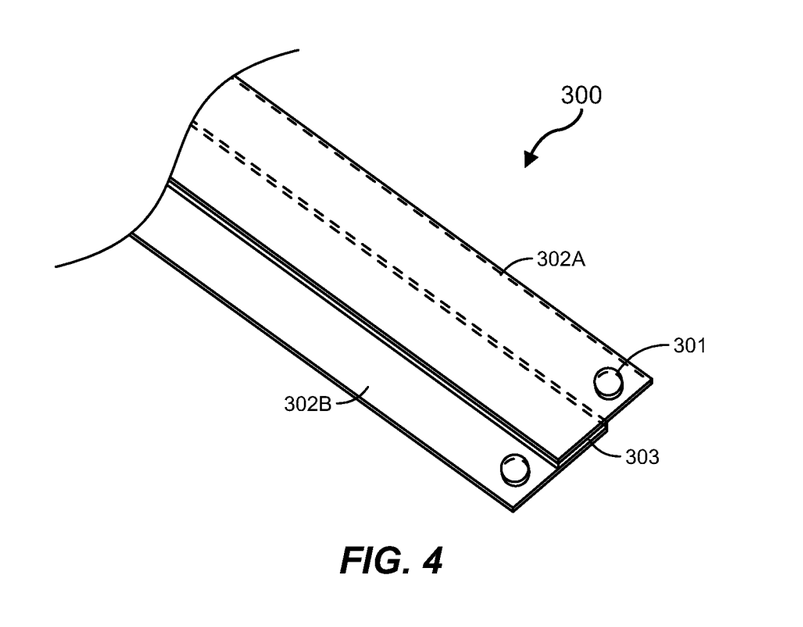
FIG. 4 illustrates a perspective view of an embodiment of a tracking bonding material.
Figure 5:
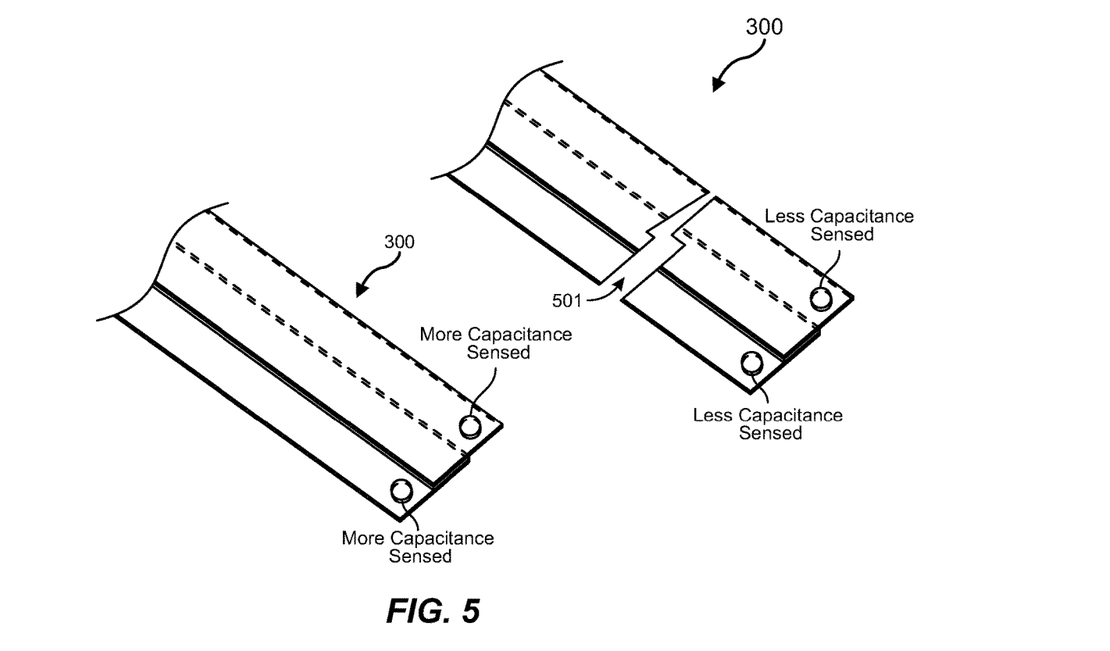
FIG. 5 illustrates embodiments where more or less capacitance is sensed based on the location of a tear.

FIG. 4 illustrates a top perspective view of capacitive tape 300. The capacitance sensors 301 may be connected to opposite sheets of conductive foil, 302A and 302B, separated by the dielectric layer 303. If the capacitive tape is unbroken, a greater amount of capacitance is sensed (as shown in FIG. 5). If the capacitive tape is broken (e.g., at 501), a lesser amount of capacitance will be sensed at the sensors 301. Because less dielectric material is connected to the sensors 301, less capacitance will be sensed. When the dielectric is whole, more material is available to store a charge and, as such, more capacitance will be sensed. Similar principles may apply to detecting changes in voltage, current, or other electrical properties.

In one embodiment, an initial capacitance (or other electrical property) measurement may be taken, and then periodically, at later times, subsequent measurements may be taken. If a substantial change has occurred (e.g., a change from 25 microfarads to 10 microfarads), the microcontroller 104 may determine that the tape has been at least partially severed, and/or that the package the tape was securing has likely been opened.

As indicated above and as shown in FIG. 1, a transceiver may also be electrically connected to the processor. The transceiver may be configured to communicate with GPS, WiFi, Bluetooth, cellular, LoRa, or other wireless networks to determine the current location of the system and/or determine the current time. In this manner, the apparatus 100 may determine its location and time when the change in capacitance occurred. This change in capacitance (or other electrical property), along with location and time data may be reported or communicated to various entities. Additionally or alternatively, the apparatus 100 may include a data store (e.g., flash memory or an EEPROM), and the processor may be configured to record any changes in capacitance in the data store as the measurements are made.

Thus, a roll or strip of tape, a sticker or other binding material may include electronic hardware components that allow the binding material to track usage of an item. In one embodiment, the tape may be a capacitive tape configured to track changes in capacitance. The capacitive tape may be manufactured as a long, capacitive strip formed into a roll, similar to a roll of conventional tape. The capacitive tape may be applied by adhering its adhesive side to a package or other item. A battery (e.g., 106) or other power source may be placed in or on the capacitive tape, along with one or more electrical property sensors, and a processor or microcontroller. The battery may provide power for the processor to take readings using the capacitance sensors and may provide electrical current to the traces or other electrically conductive medium. Using these readings, the processor can track whether the item to which the tape is adhered has been used.

For example, as shown in FIG. 6, by wrapping the capacitive tape around a box 600, the tape will enclose those parts of the box that will most likely be opened to get access to the box's contents. As the box is opened, the capacitive tape will likely break at some point along its length. The microprocessor 104 and/or sensors 301 may then measure a new capacitance (or other electrical property) that corresponds to the portion of the tape still attached to the microprocessor and sensors.

As shown in FIG. 6, the apparatus 100 (e.g., capacitive tape) may have one or more traces 107 that run the length of the box 600. Alternatively, the tape 100, or may have two foil layers separated by a dielectric layer as shown in FIGS. 3-5. The tape 100 may have hardware structure 103 embedded in one end thereof or may include leads to which the hardware structure can be attached prior to shipping. In some cases, the hardware elements of the hardware structure 103 may not be activated for a specified period of time to allow sufficient time for transit. This may save battery power if the package will be in transit for an extended amount of time. If the package is opened during transit, when the hardware structure 103 is activated, it will detect that the package has already been opened and may report such using the transceiver 105.

Figure 7:
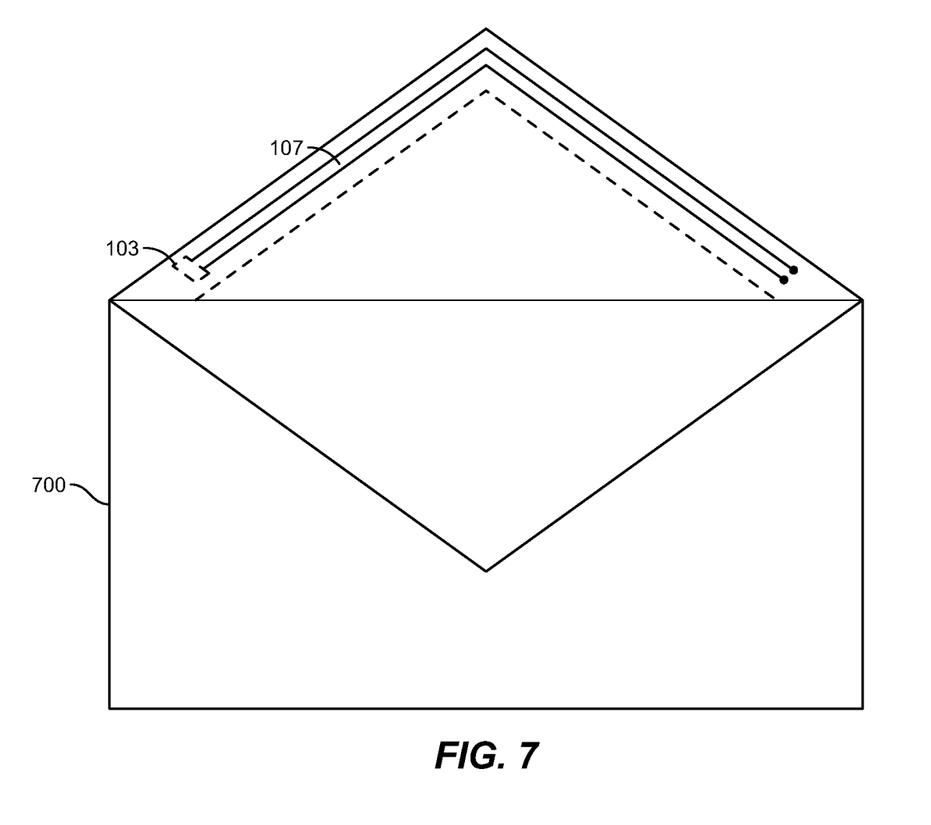
FIG. 7 illustrates an embodiment in which a tracking bonding material is applied to an envelope.

In some embodiments, as shown in FIG. 7, the structural layer 101 may be paper and the adhesive layer 102 may be bonded with paper to form an envelope 700. This envelope 700 may have electrically conductive material distributed thereon (e.g. traces 107 or conductive ink). As such, when the conductive material is broken, electrical properties may change by a certain amount and the microcontroller may be configured to report the change. For instance, if the traces 107 are broken when opening the envelope 700 along its outer seal, then the microcontroller may determine that the envelope has been opened and may note the current time and the location of the envelope. As such, the sender of the envelope may be notified that not only was the envelope delivered, it was opened on a specific date and at a specific time. As with the tape described above, the hardware structure 103 or any of the individual components (e.g., the microprocessor 104, the transceiver 105, the battery 106, sensors or other components) may be embedded in the envelope or may be attached to electrical leads that are connected to the conductive material 107.

Figure 8:
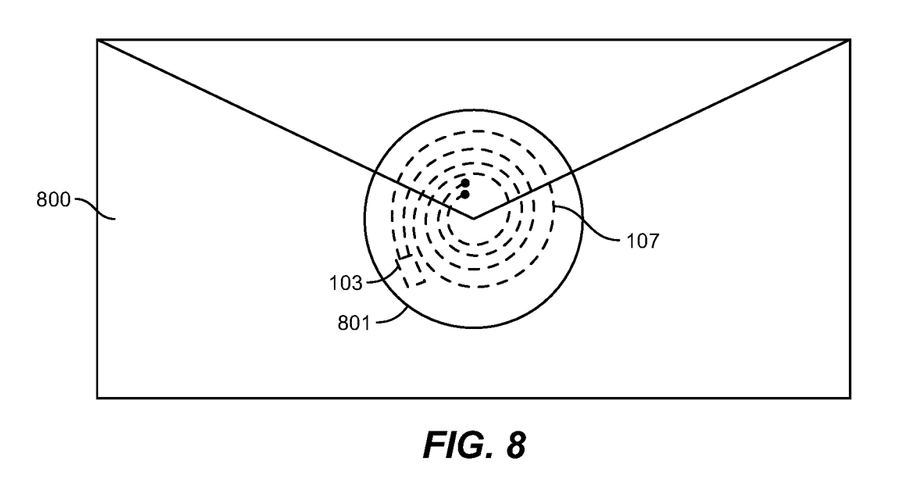
FIG. 8 illustrates an embodiment in which a tracking bonding material in the form of a sticker is applied to an envelope.

In other embodiments, as shown in FIG. 8, the structural layer 101 may be paper-based. In such cases, the paper and the adhesive layer may be bonded together to form a sticker 801. The sticker may be placed over the packaging of items that are to be opened (e.g. pill bottles, electronic items, food items, etc.). In the embodiment shown in FIG. 8, the sticker 801 may be used to seal the envelope 800. The sticker 801 may include one or more conductive traces 107 or other conductive materials. The sticker 801 may also include a hardware structure 103 that may include a microprocessor, transceiver, battery, sensors or other components. The hardware structure 103 may be embedded into the sticker or may be added on later, for example, by attaching the hardware structure to one or more electrical leads.

When the sticker 801 is torn, the electrically conductive material (e.g., traces 107) may no longer conduct and the microcontroller in hardware structure 103 may note the time and place of the tear. Such stickers may be placed on substantially any type of item, including directly on products. Thus, tracking stickers may be placed on products or other items that are to be shipped, and then tracking tape may be used to seal the box or package in which the products are shipped. Thus, the embodiments herein may track both packaging and transit, as well as the individual products that are in the packages. Manufacturers and distributors may be notified when packages are opened and also when the items in the packages are opened. In some cases, regardless of industry, inventory managers or other users may be notified when a sticker that was applied to an inventory item has been torn or removed. These notifications may be sent automatically without any user intervention. Backend systems including cloud databases may note which items have been opened and which have not. This aspect may help inventory managers to know if, when and where customers are opening their packages and their products.

In some embodiments, the tape or sticker may include some form of non-conductive shielding around the capacitive layer to prevent false positives. For instance, rubber or an electrically insulating polymer material may be used to coat the sides of the electrically conductive layers 302A/302B. This may prevent fingers or other capacitance-disturbing environmental elements from crossing the threshold and registering as "broken tape." This non-conductive shielding may be applied in a single layer or in multiple layers and may be applied over the entire surface of the tape/sticker/envelope, or over specified portions thereof.

Thus, a system may be provided for monitoring usage of an item. The item may be a package, letter, commercial (retail) product, magazine, book, or any other item. These items may be enclosed in boxes, plastic wrap, envelopes, or other containers. These containers may be sealed with a sticker or tape, including a capacitive sticker or tape as described herein. Such capacitive tape may be made of aluminum, copper, or any other metal or substance capable of holding a relatively small amount of electricity (i.e. any material that can act as a capacitor). This capacitive tape (or sticker) may include an electrically conductive layer that includes at least some portion of electrically conductive material. The capacitive tape may also include an adhesive layer that is applied to the electrically conductive layer. An embedded processor or other type of microprocessor may then be electrically connected to the electrically conductive material in the electrically conductive layer. That processor may be configured to monitor the conductive material for incremental changes in capacitance or other electrical property.

In another embodiment, a method is provided for monitoring usage of an item. The method may include attaching tracking tape or stickers to a structural layer of an item such as a box or product package (e.g., box 600 of FIG. 6). The tracking tape may be multifunctional in that it secures the item or package and also tracks when and where the item or package was opened. The method may further include attaching a microprocessor and/or a transceiver to the capacitive tape and removing an insulating tab which, when removed, connects the microprocessor to a power supply and one or more sensors such as capacitive sensors. Once this insulating tab has been removed, the processor may begin receiving readings from the sensors. The processor may take initial electrical property readings and calibrated the measurements for that electrical property to zero. Then, any subsequent readings may be stored locally in memory and/or transferred to other entities. The method may further include periodically waking the microprocessor to sense the capacitance of the tape. Intervals for taking measurements may vary for different products, for different types of tape, sticker or envelope, or for different implementation scenarios.

In some cases, if the capacitance or other electrical property sensed by the capacitive sensors has changed beyond a threshold amount, the transceiver will be used to transmit a signal indicating the item has been opened. If the change in capacitance is very minor and is below a specified threshold, no reporting may take place, or other reporting may indicate that the package may have been slightly damaged but not opened. Capacitive tape strips may be short (e.g. 1-12 inches) or may be very long (e.g. 1-10 feet or longer). When the capacitive tape is torn, the location of the tear may affect the capacitance reading.

For example, if a four-foot length of capacitive tape is used to cover a large box, and if the capacitive tape is torn three feet from the capacitance sensors and is then torn again three inches from the sensors, the sensors may note a small change in capacitance with the first tear and may note a large change in capacitance with the second tear. This is because the first tear leaves a larger amount of capacitive material left to hold a charge, while the second tear leaves relatively little capacitive material. Accordingly, the amount of change in capacitance or other electrical property indicates a degree to which the capacitive tape has been torn and can indicate where on the tape strip the tear occurred.

In one specific embodiment, a system is provided for monitoring usage of an item. The system may include a structural layer that provides support for one or more other system components, an electrically conductive layer that includes at least some portion of electrically conductive material, an adhesive layer that is applied to at least a portion of the electrically conductive layer, and a processor that is electrically connected to the electrically conductive material in the electrically conductive layer. The processor may be configured to monitor the conductive material for incremental changes in one or more electrical properties including capacitance, resistance, voltage or current.

The system may further include one or more transceivers configured to communicate with computer networks to determine the current location of the system. The transceiver may be used to determine where the system was located and when the change in the one or more electrical properties occurred. The processor may report the incremental changes in the electrical properties to at least one specified entity such as a shipping entity or product manufacturer. The system may also include a data store. In such cases, the processor may be configured to record any changes in the electrical properties in the data store.

In some embodiments, the system may include a hardware structure (e.g., 103 of FIG. 1) that includes one or more hardware components such as the processor, transceiver and/or battery. In some embodiments, the hardware structure 103 may also include a display. The display may be a segmented display configured to show characters, numbers and/or symbols, a liquid crystal display (LCD), or similar type of display that can display images or text. The display may indicate, for example, an identifier for the tracking tape or sticker. The display may also indicate how much of the tape roll has been used. Still further, the display may indicate the current date and time, and may indicate when each of the removed sections of tape were removed from the roll. In some cases, the display may be detachable, or may be part of the hardware structure 103. In some cases, the display may be included on each sticker, envelope or section of tape, while in other cases, the display may be attached to leads and may display data after the microprocessor detects its presence.

In some embodiments, the hardware structure 103 may further include an accelerometer. The accelerometer may be configured to sense movement. As such, if the tape or sticker is applied to an item, the accelerometer may detect when the item is moving. At such points, the accelerometer may wake one or more other components in the hardware structure to begin taking measurements. Additionally or alternatively, the accelerometer may detect if a package, box or other item is being jerked around as would happen if a user is tearing open or cutting open a package. Such movements may also wake the microcontroller and/or sensors to begin determining whether the tape/sticker has been torn. In cases where the package or item is sitting still, the accelerometer may indicate no movement and may preserve battery by not waking the detecting components.

In some embodiments, the system may include a single dielectric layer surrounded by two conductive layers. In other cases, the system may include two dielectric layers surrounded by three conductive layers, forming a sandwich that alternates between conductive layers and dielectric layers. Many different layers and layer structures may be used in the system. Moreover, the dielectric layer need not be a single straight line. The dielectric layer may be patterned (e.g., in a snaking s-shaped pattern, in a square pattern, in a zig-zag pattern, in a circular or spiral pattern or in some other shape). The capacitance layer may be of the same or similar thickness throughout or may vary in thickness in different locations. In cases where a dielectric layer is surrounded by two conductive layers, the conductive layers may overlap in such a manner that the overlap only occurs along the portions of dielectric, in whichever pattern the dielectric material is distributed.

Figure 9:
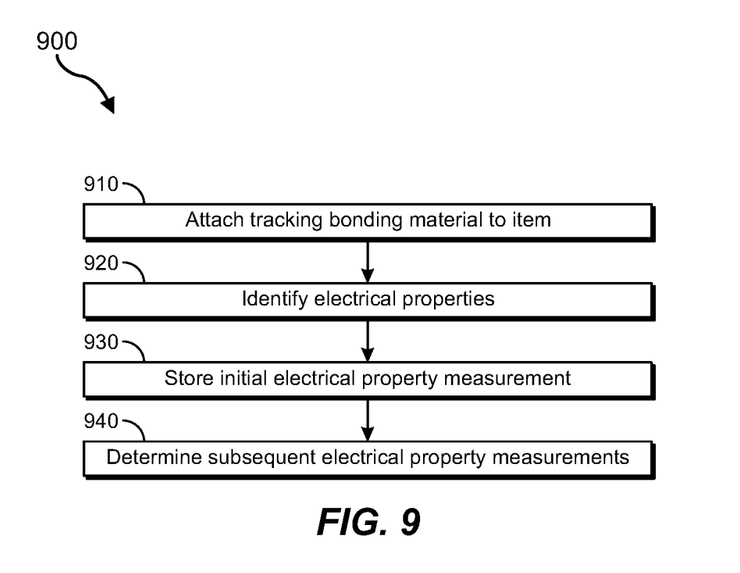
FIG. 9 illustrates a flowchart of an example method for monitoring usage of an item.

In view of the systems and architectures described above, methodologies that may be implemented in accordance with the disclosed subject matter will be better appreciated with reference to the flow chart 900 of FIG. 9. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 9 illustrates a flowchart of a method 900 for monitoring usage of an item. The method 900 will now be described with frequent reference to the components of apparatus 100 of FIG. 1.

Method 900 includes attaching tracking bonding material to an item, such that the tracking bonding material is affixed to the item, the tracking bonding material including a microprocessor, a power supply, a transceiver and one or more sensors electrically connected thereto (910). For example, as shown in FIG. 1, tracking bonding material 100 (e.g., tape) may be attached to a box, package, envelope, product box or wrapper, or other item. The tracking bonding material 100 may include multiple segments, each with its own embedded hardware components including a microprocessor 104, a transceiver 105, a battery 106, and/or sensors (e.g., 301 of FIG. 3). The hardware components may be part of a hardware structure 103. This hardware structure may be electrically connected to traces 107, or to conductive layers (e.g., 302A/302B) separated by a dielectric layer 303. The hardware structure 103 may be embedded in the tracking bonding material 100 or may be attached to electrical leads connected to the traces or conductive layers.

Method 900 further includes communicating with the one or more sensors to determine a current level of one or more electrical properties associated with the tracking bonding material (920). For instance, the microprocessor 104 may communicate with the sensors 301 to determine a current electrical property level such as a current resistance level, a current capacitance level, a current magnetic field level, etc. This initial electrical property measurement may then be stored in memory (930).

Method 900 may next include periodically waking the microprocessor to determine at one or more future points in time, using the one or more sensors, the current level of the one or more electrical properties associated with the tracking bonding material (940). Thus, at later points in time (e.g., after a package has been shipped), the electrical property levels of the tracking bonding material may be measured by the microcontroller. If the levels are higher or lower than expected or are sufficiently higher or lower than the initially measured (and stored) amounts, then the microprocessor may determine that the package, envelope, product box or other item has been opened.

In some cases, when the microcontroller determines that at least one of the electrical properties has changed beyond a threshold amount, the microcontroller may then implement the transceiver to send a notification indicating the item has been opened. This signal may be sent to one or more different entities including a product manufacturer, a distributor, a sender of an envelope or package, or other entity. In some cases, the notification may include an indication of the amount of change in the electrical property. For instance, the notification may indicate that a relatively large change in an electrical property occurred and may, in some cases, include the actual amount of change in farads, ohms, volts, etc. In other cases, this amount of change may be translated into a corresponding picture or gif indicating how much the tape, sticker or envelope was ripped. If the amount of change is sufficiently large, for example, an image or icon indicating a full rip may be presented in the notification. If the amount of change was relatively small, the notification may include an image or gif showing a small rip or tear in the tape, but not a full tear. Thus, the notification may indicate a degree to which the tracking bonding material has been torn.

As noted above, in some embodiments, the microprocessor 104 may not be activated until a specified time or until the sensor have sensed a sufficient change in an electrical property. In other cases, the microprocessor 104 may be activated upon a user removing an insulating tab. When this tab is removed, the microprocessor is then connected to a power supply (e.g., battery 106) and may be further connected to one or more sensors. This may be an additional step that saves battery life when tracking items using bonding materials.

Accordingly, systems, apparatuses and methods are provided which assist in tracking usage of a product using bonding materials. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. An apparatus for tracking usage of an item, comprising:
   a power supply;
   a structural layer that includes at least some portion of electrically conductive material;
   an adhesive layer configured to adhere the structural layer to an item;
   a microcontroller that is electrically connected to at least a portion of the conductive material in the structural layer; and
   a transceiver,
   wherein the microcontroller is configured to perform the following:
      monitor the conductive material for changes in at least one electrical property,
      determine that at least one electrical property has changed in the conductive material by a measured amount indicating a partial tear in the conductive material,
      determine a current location of the apparatus, and
      report the results of the determinations including an indication of the measured amount by which the at least one electrical property changed to one or more specified entities.

2. The apparatus of claim 1, wherein the microcontroller, power source and transceiver are embedded in the structural layer of the apparatus.

3. The apparatus of claim 1, wherein the microcontroller has access to a first identifier that identifies itself, and has access to a second identifier that identifies the apparatus.

4. The apparatus of claim 1, wherein the electrically conductive material comprises conductive ink.

5. The apparatus of claim 1, wherein the electrically conductive material comprises one or more electronic traces.

6. The apparatus of claim 1, wherein the transceiver comprises a radio frequency identifier (RFID) chip.

7. The apparatus of claim 1, wherein the transceiver is configured to communicate with one or more computing systems via a computer network.

8. The apparatus of claim 1, wherein the structural layer and adhesive layer are bonded together to form tape.

9. The apparatus of claim 8, wherein the tape is applied to packaging material, such that changes in an electrical property of the tape indicate that a package has been opened.

10. The apparatus of claim 1, wherein the structural layer comprises paper, and wherein the paper and the adhesive layer are bonded together to form an envelope.

11. The apparatus of claim 1, wherein the structural layer comprises paper, and wherein the paper and the adhesive layer are bonded together to form a sticker.

12. The apparatus of claim 1, wherein the apparatus is applied to one or more inventory items, such that when the inventory items are opened, inventory managers are notified.

13. A system for monitoring usage of an item, comprising:
    a structural layer that provides support for one or more other system components;
    an electrically conductive layer that includes at least some portion of electrically conductive material;
    an adhesive layer that is applied to at least a portion of the electrically conductive layer; and
    a processor that is electrically connected to the electrically conductive material in the electrically conductive layer, the processor being configured to monitor the conductive material for incremental changes in one or more electrical properties, determine that at least one electrical property has changed in the conductive material by a measured amount indicating a partial tear in the conductive material, and report the results of the determination including an indication of the measured amount by which the at least one electrical property changed to one or more specified entities.

14. The system of claim 13, further comprising a transceiver configured to communicate with a computer network to determine the current location of the system.

15. The system of claim 14, wherein the transceiver determines where the system was located and when the change in the one or more electrical properties occurred.

16. The system of claim 13, wherein the processor reports the incremental changes in the one or more electrical properties to at least one specified entity.

17. The system of claim 13, further comprising a data store, wherein the processor is configured to record any changes in the one or more electrical properties in the data store.

18. A method for monitoring usage of an item, comprising:
    attaching tracking bonding material to an item, such that the tracking bonding material is affixed to the item, the tracking bonding material including a microprocessor, a power supply, a transceiver and one or more sensors electrically connected thereto;
    communicating with the one or more sensors to determine a current level of one or more electrical properties associated with the tracking bonding material;
    storing an initial electrical property measurement in memory; and
    periodically waking the microprocessor to determine at one or more future points in time, using the one or more sensors, a measured amount of the one or more electrical properties associated with the tracking bonding material indicating a partial tear in the conductive material, and to report the measured amount by which the one or more electrical properties changed to one or more specified entities.

19. The method of claim 18, further comprising upon determining that at least one of the electrical properties has changed beyond a threshold amount, sending a signal using the transceiver indicating the item has been opened.

20. The method of claim 18, wherein the amount of change in at least one of the electrical properties indicates a degree to which the tracking bonding material has been torn.

* * * * *